(12) United States Patent
Shoji

(10) Patent No.: US 7,564,600 B2
(45) Date of Patent: Jul. 21, 2009

(54) IMAGE READING APPARATUS

(75) Inventor: Naoki Shoji, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1076 days.

(21) Appl. No.: 10/792,898

(22) Filed: Mar. 5, 2004

(65) Prior Publication Data
US 2005/0195450 A1  Sep. 8, 2005

(51) Int. Cl.
H04N 1/04 (2006.01)

(52) U.S. Cl. .................. 358/498; 358/474; 358/497; 358/496; 399/367; 399/371; 271/291

(58) Field of Classification Search ................ 358/497, 358/474, 498, 486; 399/367, 371, 372, 365; 271/3.14, 291
See application file for complete search history.

(56) References Cited

U.S. PATENT DOCUMENTS

| | | | |
|---|---|---|---|
| 3,674,354 A * | 7/1972 | Artaud et al. ............... 399/143 |
| 5,083,162 A * | 1/1992 | Hanamoto et al. .......... 399/184 |
| 6,027,114 A * | 2/2000 | Watanabe et al. ....... 271/265.01 |
| 6,137,900 A * | 10/2000 | Steidel et al. ............... 382/142 |
| 6,961,152 B1 * | 11/2005 | Watanabe et al. ........... 358/296 |
| 2002/0054776 A1 * | 5/2002 | Iimuro ........................ 399/361 |
| 2003/0210939 A1 * | 11/2003 | Kobayashi et al. .......... 399/367 |
| 2003/0227654 A1 * | 12/2003 | Shiraishi ..................... 358/474 |

FOREIGN PATENT DOCUMENTS

| | | | |
|---|---|---|---|
| JP | 63041350 | * | 2/1988 |
| JP | 11-79516 A | | 3/1999 |
| JP | 2002-247300 A | | 8/2002 |

* cited by examiner

*Primary Examiner*—Negussie Worku
(74) *Attorney, Agent, or Firm*—Foley & Lardner LLP

(57) ABSTRACT

The image reading apparatus of this invention moves the discharge guide to lead documents after passing the contact glass to the discharge tray in order to cope with different functions to improve image reading accuracy demanded for the image reading and to increase stacking capacity of the discharge tray easily. The image reading accuracy is improved when the width of documents to contact the contact glass surface is made wide by making the tilt angle of the discharge guide small to get the documents parallel to the contact glass surface. The stacking capacity of the discharge tray increases when the tilt angle of the discharge guide is made large.

10 Claims, 4 Drawing Sheets

IMAGE READING APPARATUS

BACKGROUND OF THE INVENTION

1. Field of the Invention

This invention relates to a sheet through reading type image reading apparatus to read documents passing through a contact glass surface and more particularly to an image reading apparatus to convey documents stably on a contact glass surface.

2. Description of the Related Art

A sheet through type image reading apparatus that is used in an image forming apparatus for image reading reads documents which are conveyed by an automatic document feeder and sequentially passing on a contact glass surface using a stationary image sensor. When documents are read with this image sensor, read images are blurred by the changes in the passing position of documents on a contact glass surface and the quality of read images are varied. In particular, in the case of color image documents, the quality of read image is largely affected by the change in passing position of documents on a contact glass surface and the image quality may be deteriorated remarkably depending on the passing position of documents on a contact glass surface.

In view of the above, a technology to set the reading position of an image reading apparatus corresponding to changes in the passing position of documents on a contact glass surface is so far proposed as disclosed in Japanese Patent Application No. 2002-247300.

However, in the conventional technology described above, it is necessary to compute a passing position of documents on a contract glass surface from sampling data using documents for use in adjustment when the image reading portion is moved and set. Therefore, the moving and setting operation of the image reading portion was complicated.

Accordingly, in the sheet through reading type image reading apparatus, it is desirable to make the operation easy and retain read images in stabilized quality irrespective of conditions for conveying documents to a contact glass surface.

SUMMARY OF THE INVENTION

An object of this invention is to stabilize the document passing position on a contact glass surface irrespective of document conveying conditions and to obtain a high quality level of image reading stably.

According to embodiments of this invention, the image reading apparatus of this invention is composed of an image sensor to read images on documents passing over a moving image reading position; a discharge tray to sequentially stack the documents passed the moving image reading position; a tilted guide unit of which tilt is adjustable provided between the moving image reading apparatus and above the discharge tray; a conveying member to convey the documents guided by the guide member in the direction of the discharge tray; and a driver to adjust the tilted angle by moving the guide member.

Further, according to the embodiments of this invention, the image reading apparatus is composed of an image sensor to read document images on documents passing the moving image reading apparatus; a discharging tray to stack the documents sequentially after passing the moving image reading position; a guide unit provided between the moving image reading position and the discharge tray, which has a tilted discharging guide of which tilt angle is adjustable and a conveying member to convey the documents guided by the discharge guide in the direction of the discharge tray, and is rotatable centering around the side portion of the moving image reading position as a supporting point; and a driver to rotate the guide unit.

DETAILED DESCRIPTION OF THE INVENTION

Figure 1:
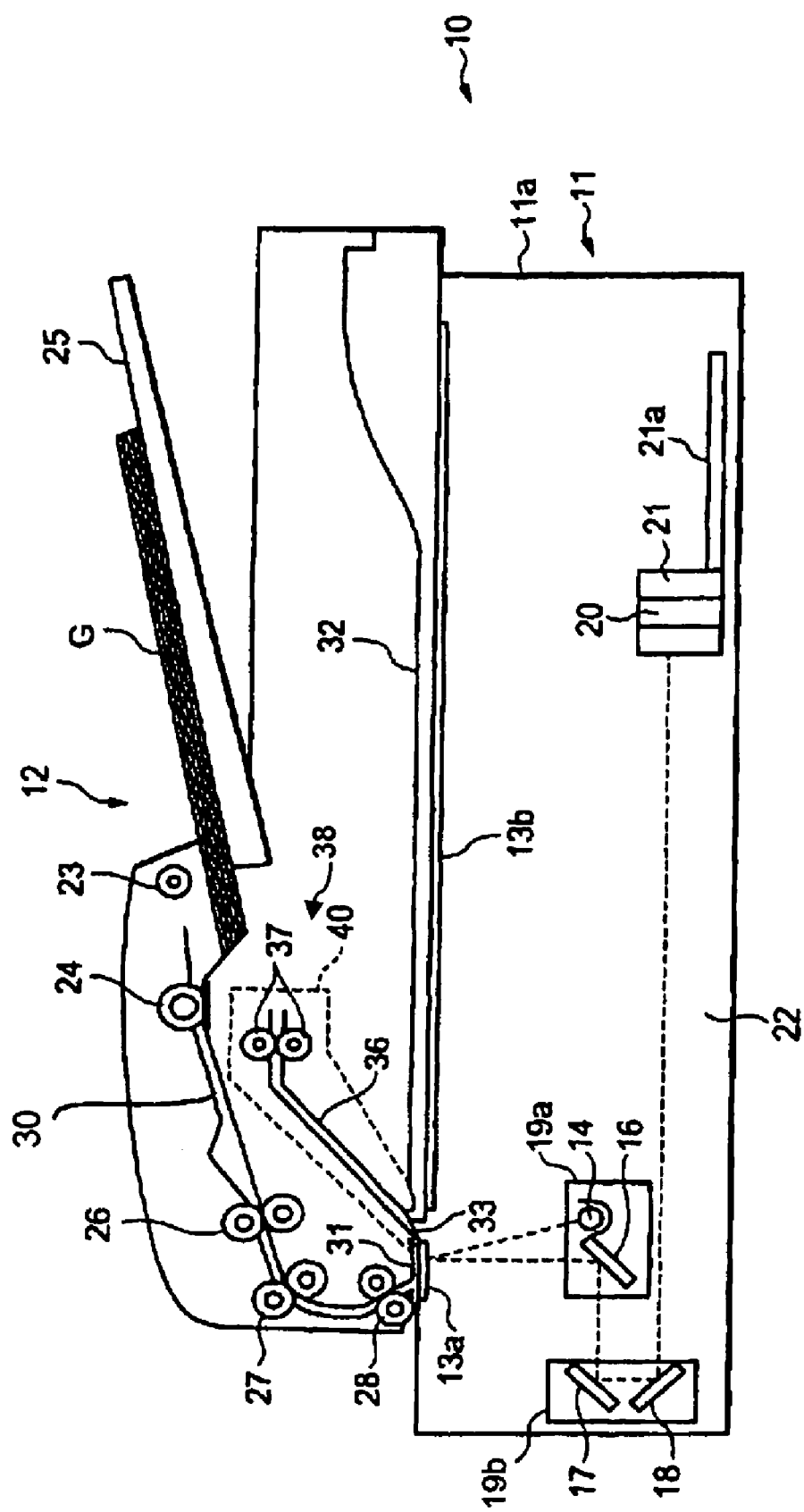
FIG. 1 is a schematic construction diagram showing an image reading apparatus in a first embodiment of this invention.

A first embodiment of this invention will be explained in detail referring to attached drawings. FIG. 1 is a schematic construction diagram showing a sheet through type image reading apparatus 10. Sheet through type image reading apparatus 10 is composed of a scanner 11 to read images and an automatic document feeder 12. There is a first contact glass 13a provided at the moving image reading position on the top surface of a housing 11a of scanner 11. Further, on the top surface of housing 11a, a second contact glass 13b. Automatic document feeder 12 sends a document G to first contact glass 13a. In the inside of the housing 11a of scanner 11, an image sensor 22 comprising a light source 14, first through third mirrors 17, 17, 18, and a CCD sensor 21 that has a lens 20 and a control panel 21a is provided.

Light source 14 and first mirror 16 are installed on a first carriage 19a and second and third mirrors 17 and 18 are installed on a second carriage 19b. When a document G placed on second contact glass 13b is read, first and second carriage 19a and 19b scan the document in the sub-direction.

Automatic document feeder 12 is so arranged as to cover contact glasses 13a and 13b on the top surface of scanner 11 and able to open/close on contact glasses 13a and 13b. Automatic document feeder 12 has a pick-up roller 23 to take out documents G from a document table 25 before reaching first contact glass 13a, a document separation roller 24 to separate documents G supplied by this pick-up roller 23, conveying rollers 26, aligning rollers 27, before-reading rollers 28, and a guide plate 30 to guide documents G. Further, a reading guide 31 is provided at a position opposite o first contact glass 13a to have documents G contact first contact glass 13a.

Further, a jump table 33 to scoop up the edge of document G from first contact glass 13a and a guide unit 38 to lead document G from jump table 33 to document discharge tray 32 are provided between first contact glass 13a of automatic document feeder 12 and a discharge tray 32. Guide unit 38 supports both sides of discharge guide 36 that is a guide member to guide documents G to a discharging port 34 above document discharge tray 32 and discharge rollers 37 which are conveying members. Discharge guide 36 is composed of first and second discharge guides 36a, 36b fixed to a support frame 40 and a third discharge guide 36d that is rotatably attached to support frame 40 by a shaft 36c.

Guide unit 38 is made rotatable centering around a supporting point 38a provided at the edge of first contact glass 13a that is a supporting shaft of discharge guide 36 by a pinion 42 engaged with racks 41 and 42 formed on the side of supporting frame 40. Rack 41 and pinion 42 comprises a driving gear. When guide unit 38 is turned, discharge guide 36 rotates centering around supporting point 38a provide at the side of first contact glass 13a.

In general, in a sheet through type image reading apparatus, the more the discharging angle of document from the moving image reading apparatus is close, the more the behavior of document is stabilized at the moving image reading position. For example, when the rear edge of document G passes over the first contact glass 13a, there is no longer control by before-read rollers 28. Therefore, when a tilt angle of discharge guide 36 is made large, the contacting width t1 of a document G with the surface of fist contact glass 13a is narrowed as shown by the solid line α in FIG. 4. On the other hand, when the tilt angle of discharge guide 35 is made small, the contacting width t2 of document G with first contact glass 13a becomes wide as shown by the dotted line β in FIG. 4 and the passing position of document G on first contact glass 13a is stabilized. Accordingly, when the tilt angle of discharge guide 36 is less, document is read by scanner 11 in the state more firmly contacted to first contact glass 13a and a highly precise image data without blurring is obtained and a high quality read image is obtained. When documents become thicker, the behavior of documents on first contact glass 13a becomes unstable and read images tend to blur.

So, in this embodiment, in the case of a thick document which tends to act unstably or a color image document of which image quality is largely affected by blur of reading position, discharge guide 36 is set at a small tilt angle so that the discharge angle of documents from first contact glass 13a becomes nearly parallel to first contact glass 13a. On the other hand, in the case of monochrome image document and ordinary paper or thin paper, the tilt angle of discharge guide 36 is set largely so as to increase the stacking capacity of discharge tray 32.

Figure 2:
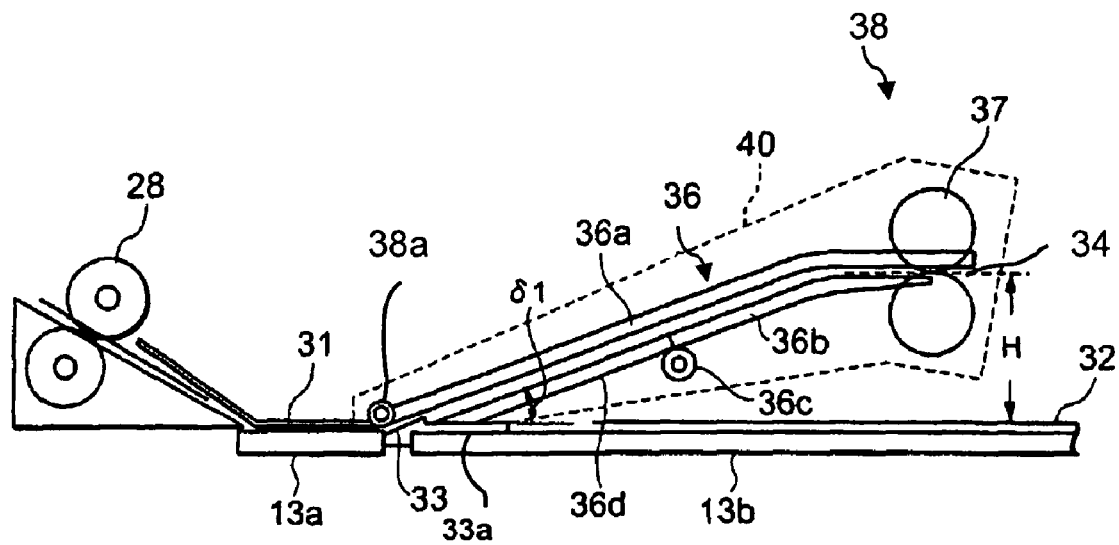
FIG. 2 is a schematic construction diagram showing a guide unit that is set at a first position in a first embodiment of this invention.
Figure 3:
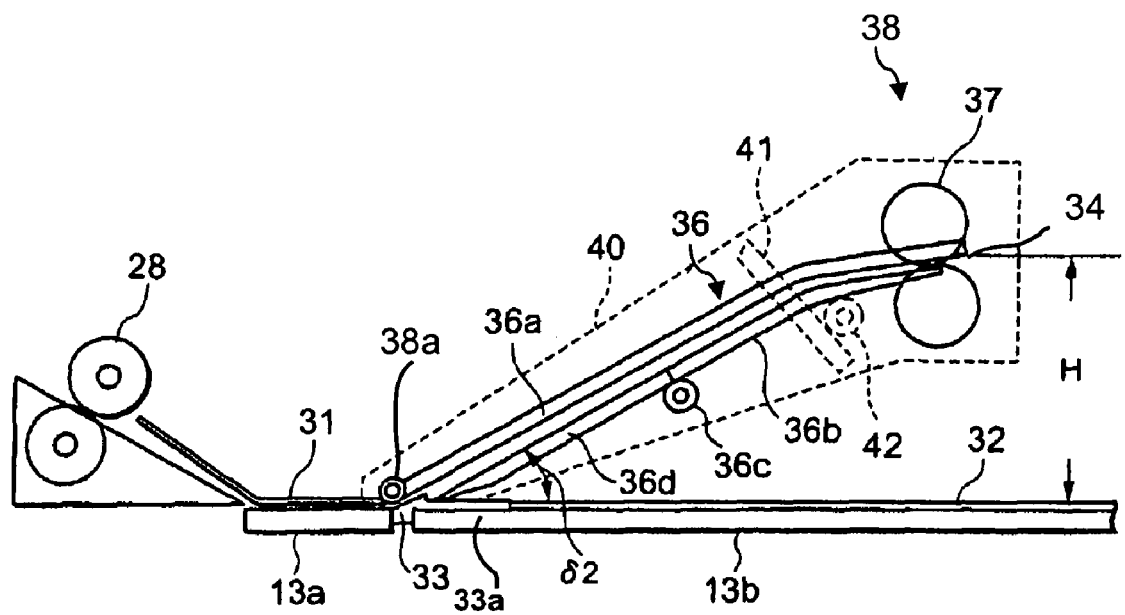
FIG. 3 is a schematic construction diagram showing a guide unit that is set at a second position in the first embodiment of this invention.

That is, when a thick document or a color image document is selected for the image reading operation, guide unit 38 is rotated centering around supporting point 38a by rack 41 and pinion 42 and is set at a first position where the tilt angle δ1 of discharge guide 36 becomes 15° to 30° nearly parallel to first contact glass 13a as shown in FIG. 2. Further, when an ordinary paper document or a thin paper and monochrome image document is selected in the image reading operation, guide unit 38 is rotated around supporting point 38a by rack 41 and pinion 42 and is set at a second position where the tilt angle δ2 of discharge guide 36 becomes 40° to 50° as shown in FIG. 3. When discharge guide 36 is rotated from the position of tilt angle δ1 nearly parallel to contact glass 13a to the position of tilt angle δ2, the height from discharge roller 37 to discharge tray 32 is increased for the increased tilt angle and the stacking capacity of discharge tray 32 is increased.

Figure 5:
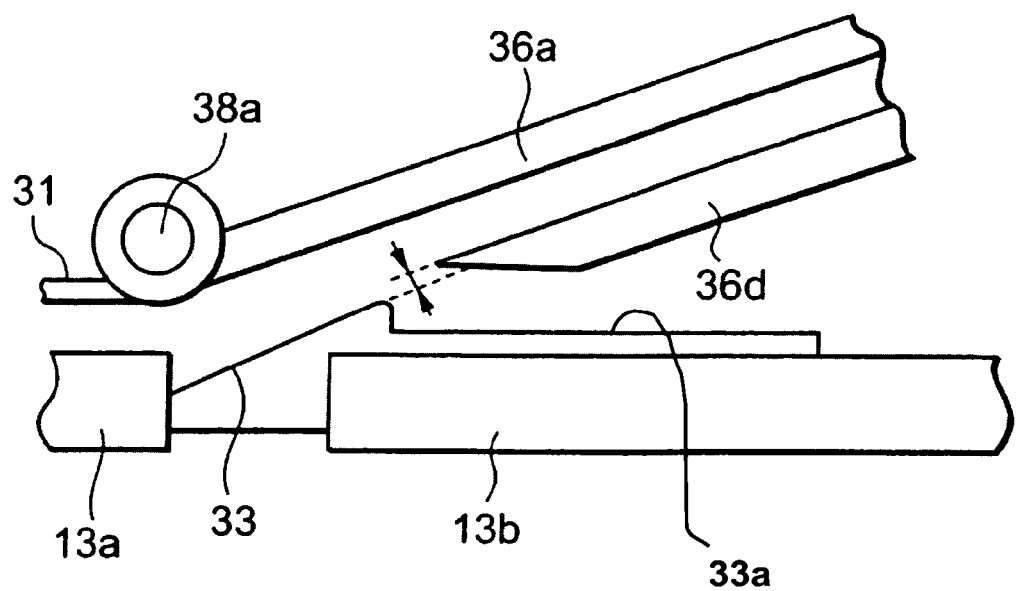
FIG. 5 is an explanatory diagram showing the edge of a third discharging guide when the guide unit is at the first position in the first embodiment of this invention.

Because third discharge guide 36d is rotatable centering around shaft 36c irrespective of the rotation of guide unit 38, the edge of third discharge guide 36d is always in contact with a flat portion 33a of jump table 33 by its own weight. When, for example, third discharge guide 36d is fixed to the supporting frame, the edge of third discharge guide 36d projects upward from jump table 33 as shown in FIG. 5 when discharge guide 36 is set at the first position and the discharge of document G is impeded. Accordingly, in this embodiment, the edge of third guide 36d is prevented from projecting upward from jump table 33.

Next, the actions of this image reading apparatus will be described. When reading the image of document G by image reading apparatus 10, documents G are placed on document placing tray 25 and the image reading mode or kind of document, etc. is selected through the control panel. When the monochrome mode is selected as the image reading mode and documents G are ordinary paper, guide unit 38 is driven centering around supporting point 38a by rack 41 and pinion 42 to support discharge guide 36 at the second position where the tilt angle δ2 is 40° to 50°.

Thereafter, when the document feed operation starts, a top document G is taken out from document placing tray 25 by pick-up roller 23 and separation roller 24 and fed to the position of aligning rollers 27 by feed rollers 26 along guide plate 30. Documents G of which front edges are aligned by aligning rollers 27 are conveyed sequentially to the position of first contact glass 13a by aligning rollers 27 and before-reading rollers 28.

While documents G passing on first contact glass 13a are illuminated with the light from light source 14 and reflected light from document G is focused on a CCD 21 sequential through first to third mirrors 16 to 18 and lens 20, and document images are read.

Hereafter, documents G passed above first contact glass 13a are scooped up on jump table 33 and inserted into discharge guide 36 that is set at the second position of the tilt angle δ2 40° to 50°. At this time, the front edge of third discharge guide 36d is in contact with flat portion 33a of jump table 33 by its own weight and does not project into discharge guide 36 and does not impede the insertion of documents G into discharge guide 36. Further, the tile angle δ1 of discharge guide 36 is 15° to 30° and the front edge or the rear edge of document G passes over first contact glass 13a as shown by the solid line a in FIG. 4. However, the reading mode is the monochrome mode and the image quality is not affected even when the image reading position is somewhat moved, and a good image is taken in scanner 11. Furthermore, as documents G are ordinary paper documents, irrespective of the tilt angle of discharge guide 36 becoming large, the contact area of documents G with first contact glass 13a is not narrowed extremely and the moving of the image reading position is suppressed in the allowable range.

Documents G passed discharge guide 36 are dropped and stacked in discharge tray 32. At this time, a distance from discharge rollers 37 to discharge tray 32 is 49 mm and as the stacking capacity of discharge tray 32 is large, it becomes possible to feed documents G in large quantity by automatic document feeder 12.

When the color mode is selected as the image reading mode or thick documents G are selected, guide unit 38 is rotated centering around supporting point 38a by rack 41 and pinion 42 so as to support discharge guide 36 at the first position of which tilt angle δ1 is 15° to 30°.

When the image reading operation starts, documents G are conveyed to first contact glass 13a by automatic document feeder 12 and document images are read sequentially by scanner 11. Documents G passing above first contact glass 13a are scooped up on jump table 33 and inserted into discharge guide 36. At this time, the front edge of third discharge guide 36 is kept in contact with flat portion 33a of jump table 33 by own weights and without projecting in discharge guide 36, and insertion of documents G to discharge guide 36 is not impeded.

Figure 4:
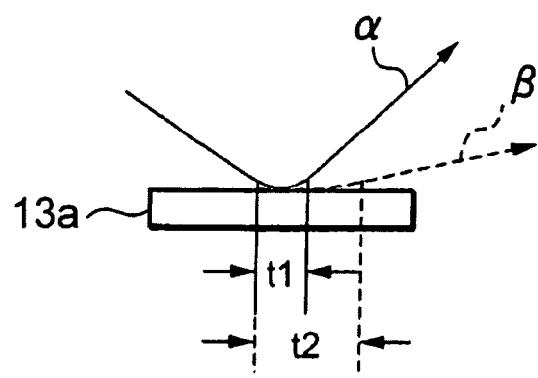
FIG. 4 is a diagram for explaining the principle of the blurring of image in the first embodiment of this invention; a schematic top view showing the range of movement of s staple sensor and a remover in the conveying path.

Further, as the tilt angle δ1 of discharge guide 36 is 15° to 30° and gets near parallel to first contact glass 13a at this time, the front edge or the rear edge of document G passes over first contact glass 13a as shown by the dotted line β in FIG. 4. Accordingly, a document image is read by scanner 11 in the state of document G firmly contacted the surface of first contact glass 13a without causing the movement of the image reading position, and a good image reading is achieved. Hereafter, documents G passed discharge guide 36 are dropped in discharge tray 32 and stacked therein.

According to this first embodiment, when image reading apparatus 10 is in the monochrome mode and reads documents G in ordinary thickness, the stacking capacity of discharge tray 32 can be increased by making the tilt angle of discharge guide 36 large and the discharging position by discharge rollers 37 high. That is, when the image reading accuracy is suppressed in the range for the good image reading, it becomes possible to increase the number of documents G that can be supplied by automatic document feeder 12 and the usability of automatic document feeder 12 can be promoted. On the other hand, when image reading apparatus 10 is in a color mode or documents G are thick, a sufficient area for document G to contact first contact glass 13a can be obtained disregarding thickness of documents G when the tilt angle of discharge guide 36 is decreased to come near parallel to first contact glass 13a and prevent the image reading from moving, obtain highly precise image data and a read image of high quality.

Next, a second embodiment of this invention will be explained. This second embodiment is the same as the first embodiment except that a driving device differs from that in the first embodiment. Accordingly, the component elements in this second embodiment as those in the first embodiment will be assigned with the same reference numerals and detailed explanations thereof will be omitted.

Figure 6:
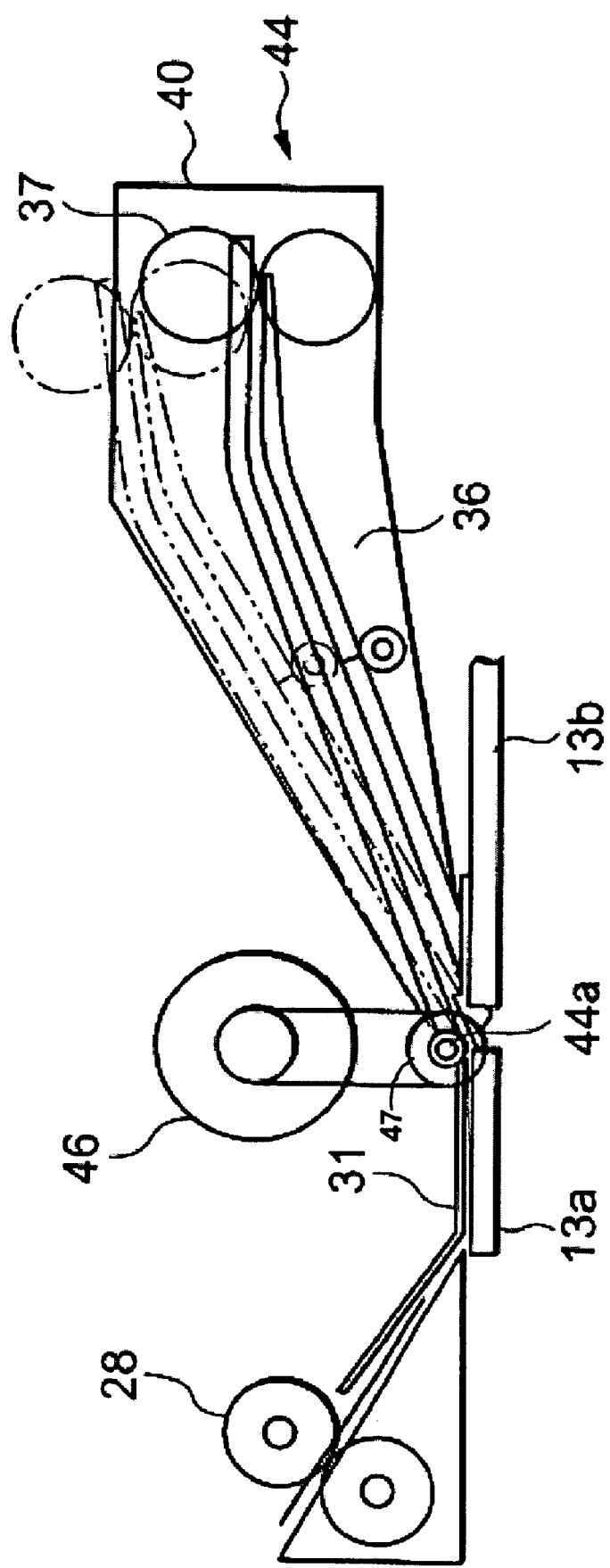
FIG. 6 is a schematic top view of a cutter mechanism in a second embodiment of this invention.

In the second embodiment, a gear 47 that is driven by a motor 46 is attached to a supporting point 44a of supporting frame 40 of a guide unit 44 as shown in FIG. 6. When reading a document image, the rotation of motor 46 is controlled according to image reading conditions, supporting frame 40 is rotated by a specified angle by rotating gear 47 by a specified angle and a tilt angle of discharge guide 36 is set.

In this second embodiment, it is also possible to increase the number of documents G that can be fed by automatic document feeder 12 by suppressing image reading accuracy in a range for a good image reading by making a tilt angle of discharge guide 36 large and promote usability of automatic document feeder 12 likewise the first embodiment described above. On the other hand, when the tilt angle of discharge guide 36 is decreased so as to make it parallel to first contact glass 13a, a read image of high quality is obtained by preventing the movement of image reading position.

Further, this invention is not restricted to the embodiments described above but can be modified variously within the scope of this invention. For example, the tile angle of guide member is not restricted and can be set optionally according to image reading accuracy demanded by the image reading apparatus and thickness of documents. Further, the movement of the tilt angles of guide members are not restricted to two stages but can be moved to plural stages as necessary. Further, conditions for setting tilt angles of guide members are also not restricted according to image reading modes and document thickness but can be adjusted according to paper quality of document or image quality, etc.

According to this invention as described above in detail, by moving the tilt angles of the guide members according to various conditions in a sheet through type image reading apparatus, the image reading accuracy can be easily improved and the high quality image reading is made possible. On the other hand, the stacking capacity of discharge tray can be increased and the usability of the image reading apparatus can be improved. Accordingly, it becomes possible to easily cope with the functions demanded in image reading only by moving guide members.

What is claimed is:

1. An image reading apparatus comprising:
   an image sensor to read images on documents passing a moving image reading position;
   a discharge tray to stack the documents sequentially after passing the moving image reading position;
   a guide member of which tilt angle is adjustably provided at a position where the document passes just beyond the moving image reading position;
   a conveying member to convey the documents guided through the guide member in the direction of the discharge tray; and
   a driver to adjust the tilt angle by moving the guide member,
   wherein the driver moves the guide member to change the tilt angle of the guide member which is set at a first position where the tilt angle is 15° to 30° when a thick document or a color image document is passed through the moving image reading position and which is set at a second position where the tilt angle thereof is 40° to 50° when a thin paper or monochrome image is passed through the moving image reading position.

2. The image reading apparatus according to claim 1, wherein the guide member rotates centering around the side of the moving image reading position.

3. The image reading apparatus according to claim 1, wherein a jump table is provided between the moving image reading position and the guide member and the adjacent portion of the guide member with the jump table does not project from the jump table.

4. The image reading apparatus according to claim 3, wherein the adjacent portion of the guide member with the jump table is formed rotatably and able to be rotated downward by its own weight.

5. The image reading apparatus according to claim 1, wherein the driver moves the guide member according to the thickness of the document.

6. The image reading apparatus according to claim 1, wherein the driver moves the guide member according to the reading accuracy of the image sensor.

7. The image reading apparatus according to claim 1, wherein the driver moves the guide member in a color image reading mode.

8. An image reading apparatus comprising:
   an image sensor to read document images on documents passing the moving image reading position;
   a discharge tray to stack the documents after passing the moving image reading position;
   a guide unit has a tilted discharge guide of which tilt angle is adjustable and a conveying member to convey the documents guided by the discharge guide in the direction of the discharge tray between the moving image reading position and above the discharge tray, and is rotatable centering around the side end of the moving image reading position at a position where the document passes just beyond the moving image reading position; and
   a driver to rotate the guide unit, wherein the driver rotates the guide member in accordance with at least one of an image reading mode, a document thickness, a paper quality of the document and an image quality, wherein the driver rotates the guide unit to change the tilt angle of the guide unit which is set at a first position where the tilt angle is 15° to 30° when a thick document or a color image document is passed through the moving image reading position and which is set at a second position where the tilt angle thereof is 40° to 50° when a thin paper or monochrome image is passed through the moving image reading position.

9. The image reading apparatus according to claim 8, wherein the driver has a rack formed on the guide unit and a pinion that engages with the rack.

10. A method for adjusting a tilt angle of a guide member in an image reading apparatus including an image sensor to read images on documents passing a moving image reading position, a discharge tray to stack the documents sequentially after passing the moving image reading position, the guide member of which tilt angle is adjustably provided at a position where the document passes just beyond the moving image reading position, and a conveying member to convey the documents guided through the guide member in the direction of the discharge tray, comprising:

selecting from one of a thick document, a color image document, an ordinary paper document, and a thin paper and monochrome image document; and moving the guide unit to change the tilt angle of the guide member in response to the selected document, wherein the guide member is set at a first position where the tilt angle thereof is 15° to 30° when the thick document or the color image document is selected for the image reading operation and the guide member is set at a second position where the tilt angle thereof is 40° to 50° when the thin paper and monochrome image document is selected for the image reading operation.

* * * * *